United States Patent Office.

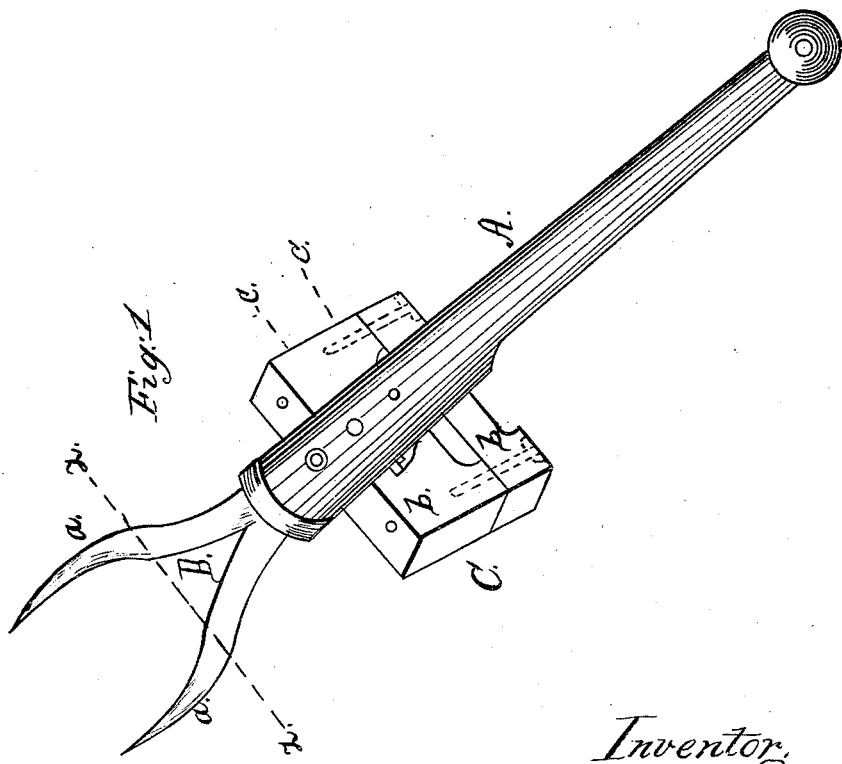

ZACHARIAH B. SIMS, OF BONHAM, TEXAS.

Letters Patent No. 94,354, dated August 31, 1869.

IMPROVEMENT IN STALK AND CANE-PULLER.

The Schedule referred to in these Letters Patent and making part of the same.

*To all whom it may concern:*

Be it known that I, ZACHARIAH B. SIMS, of Bonham, in the county of Fannin, and State of Texas, have invented a new and useful Improvement in Stalk and Cane-Pullers; and I do hereby declare the following to be a clear and exact description of the nature thereof, sufficient to enable others skilled in the art to which my invention appertains, to fully understand and use the same, reference being had to the accompanying drawings, making part of this specification, in which—

Figure 1 is a perspective view of the device illustrating my invention.

Figure 2 is a transverse section in the line $z\ z$, fig. 1.

Similar letters of reference indicate corresponding parts in the two figures.

My invention is a simple device for pulling stalk and cane; and consists of two pointed teeth or prongs peculiarly constructed, and secured to a suitable handle to which an adjustable fulcrum is connected, in order to allow the implement to be manipulated by persons of different statures and strength.

In the drawings—

A represents a handle, of ordinary construction, but made somewhat stronger at the end to which the prongs or teeth are secured.

B are teeth or prongs, and consist of two pieces of metal, united to a shank or tang, from which they open outward, in somewhat V-shape, to a point, $a$, where they extend to their ends parallel to each other, but gently curved upward. These ends are pointed, so as to readily pierce the ground.

To the handle B or shank, I secure a fulcrum, C.

This fulcrum consists of a suitable block or piece of wood or metal, and is made of two or more parts, $b$, which are fitted vertically on each other and connected together by bolts or equivalents, whereby the fulcrum may be lengthened or shortened.

A series of openings, $c$, is made in the handle, in order to change the position of the fulcrum, and thereby increase or decrease the leverage.

In the present case, the mode of securing the fulcrum to the handle or shank of the prongs, is by means of a screw-bolt (or bolts,) which passes through the two parts, and an opening is made in the fulcrum to allow access to a nut (or nuts,) which screws on to the bolt, as seen in fig. 2.

The inner face of the V-shaped portion of the prongs is bevelled, as seen at $d\ d$, whereby a firm hold is had on the stalks and cane.

In operating the device, the prongs are forced into the ground so that the narrow part will come in contact with the stalk or cane.

The handle is then brought down, whereby the stalk or cane will be raised out of the ground, a strong hold being had, owing to the sharp or bevelled edges of the prongs.

The fulcrum may be readily adjusted for persons of large and small stature, and of varying strength.

Having thus described my invention,

What I claim as new, and desire to secure by Letters Patent, is—

The combination, with the handle A and prongs B, of the fulcrum C, made adjustable, vertically and longitudinally, in the manner and for the purpose set forth.

ZACHARIAH B. SIMS.

Witnesses:
JOHN A. WIEDERSHEIM,
PHIL. F. LARNER.